United States Patent [19]

Enochs

[11] Patent Number: 4,702,547

[45] Date of Patent: Oct. 27, 1987

[54] METHOD FOR ATTACHING AN OPTICAL FIBER TO A SUBSTRATE TO FORM AN OPTICAL FIBER PACKAGE

[75] Inventor: R. Scott Enochs, Hillsboro, Oreg.

[73] Assignee: Tektronix, Inc., Beaverton, Oreg.

[21] Appl. No.: 889,703

[22] Filed: Jul. 28, 1986

[51] Int. Cl.[4] .................................................. G02B 6/36
[52] U.S. Cl. ..................................... 350/96.2; 228/121; 228/198
[58] Field of Search ................. 350/96.2, 96.21, 96.22; 228/121, 198

[56] References Cited

U.S. PATENT DOCUMENTS

| | | | |
|---|---|---|---|
| 3,316,628 | 5/1967 | Lang, Jr. ............................ | 228/121 |
| 3,432,913 | 3/1969 | Bronnes et al. ..................... | 228/121 |
| 4,357,072 | 11/1982 | Goodfellow et al. ............... | 350/96.2 |
| 4,662,962 | 5/1987 | Malavieille ........................ | 350/96.21 |

Primary Examiner—Nicholas P. Godici
Assistant Examiner—Richard K. Seidel
Attorney, Agent, or Firm—William S. Lovell; Jay K. Malkin

[57] ABSTRACT

A new and efficient method for attaching an optical fiber to a substrate to form a structurally secure optical fiber package is disclosed. The method first involves coating an optical fiber with an external layer of gold. A silicon retaining member is then provided having a groove therein sized to retain and receive the coated optical fiber. The silicon retaining member and optical fiber are then positioned on a substrate preferably constructed of alumina. Deposited on the substrate is at least one metal pad having an external gold layer on which the silicon retaining member is placed. The optical fiber, silicon retaining member, and substrate are then heated at a temperature sufficient to form a silicon/gold eutectic alloy between th silicon of the retaining member and the gold layers of the optical fiber and pad. Such heating involves a temperature of at least 370° C. Heating is preferably accomplished using a resistor secured to the underside of the substrate. The resulting package is characterized by improved strength, durability, and structural integrity.

16 Claims, 6 Drawing Figures

U.S. Patent  Oct. 27, 1987  4,702,547
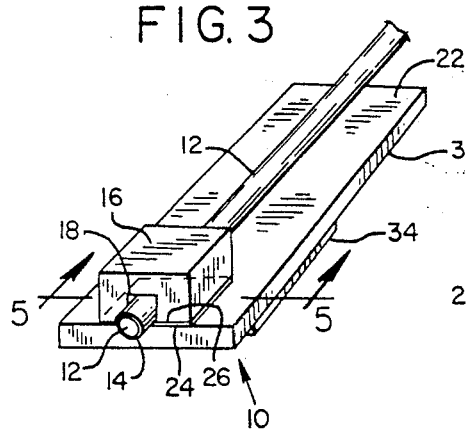

4,702,547

METHOD FOR ATTACHING AN OPTICAL FIBER TO A SUBSTRATE TO FORM AN OPTICAL FIBER PACKAGE

BACKGROUND OF THE INVENTION

The present invention generally relates to a method for attaching an optical fiber to a substrate, and more particularly to an optical fiber attachment method of improved efficiency designed to produce a highly stable optical fiber package.

New telecommunication methods, including the high-speed transmission of data, are now possible using laser technology. Specifically, the high speed transmission of information using laser light can be accomplished by the passage of such light through one or more optical fibers. Optical fibers typically used in data transmission are flexible and constructed of glass or plastic.

For optical fiber systems to function effectively, it is very important that the optical fiber or fibers be precisely aligned with the laser light source. Otherwise, the transmission of data may be impaired. Furthermore, once proper alignment is achieved, such alignment must be maintained during the assembly and operation of the system.

In typical optical fiber systems, laser light sources, including laser diodes, are mounted on support structures well known in the art, including supports of a pedestal-type configuration. As discussed above, optical fiber alignment with the laser light source is of prime importance. In order to accomplish this, conventional techniques involve securing the fiber directly to the support system associated with the laser. For example, one method first involves the application of a metal coating to an optical fiber. This coating typically consists of a primary nickel layer coated with an external layer of gold. The coated fiber is then positioned in front of the laser, and soldered to the laser support structure using lead/tin solder. However, numerous problems exist when this method is used. Primarily, the fiber is difficult to solder to the support structure and tends to alter its position during soldering. As a result, misalignment of the fiber with respect to the laser occurs.

Another conventional method involves placement of the optical fiber within a metal tube which is secured to the laser support structure. Again, alignment of the optical fiber using this system is very difficult, and affixation of the metal tube to the support structure frequently results in misalignment during the attachment process.

In order to minimize problems associated with the above-described methods, other procedures were tested in which the optical fiber was first joined to a substrate (typically manufactured of alumina), followed by attachment of the substrate directly to the laser support structure. However, when conventional methods were used to secure the optical fiber to the substrate, problems occurred. For example, one method involved soldering a gold-coated optical fiber to the substrate using lead/tin solder typically having a melting point of about 280° C. The fiber was soldered to a metal pad on the substrate, such pad having an external layer of gold and at least one underlying metal binder layer. However, during soldering, the lead/tin solder formed an alloy with the gold on the optical fiber and the metals in the pad. As a result, a melting point depression occurred, lowering the melting point of the solder significantly below 280° C. Thus, during attachment of the substrate to a laser support structure, the heat associated with such attachment frequently weakened the solder joint between the optical fiber and substrate, causing misalignment of the fiber with respect to the laser.

Another method used to secure the optical fiber to the substrate involved the use of "solder glasses." Solder glasses consist of low melting point glass compositions used to join materials together. However, joints made using solder glasses are very brittle, and are often weakened during affixation of the substrate to the laser support structure.

Finally, direct attachment of the optical fiber to a substrate is frequently characterized by problems involving internal stress within the completed assembly. Such problems result from a differential CTE (coefficient of thermal expansion) between the substrate and optical fiber. Coefficient of thermal expansion is a numerical value involving the change in size of a material per degree change in temperature. Stress-related problems most often result when an optical fiber is used having a substantially different CTE from that of its associated substrate. When heat is applied to such a system, both components will expand at different rates, thus resulting in possible bond damage or other physical harm to the optical fiber package.

Thus, a need exists for an optical fiber attachment method which enables the secure attachment of an optical fiber to a substrate while avoiding problems associated with joint weakness, internal stress, and optical fiber misalignment.

SUMMARY OF THE INVENTION

It is an object of the present invention to provide an optical fiber attachment method which enables the attachment of an optical fiber to a substrate in a strong and secure manner.

It is another object of the present invention to provide an optical fiber attachment method in which problems associated with the physical manipulation and alignment of optical fibers are minimized.

It is still another object of the present invention to provide an optical fiber attachment method which avoids misalignment of the optical fiber with respect to a laser light source at temperatures associated with the assembly and operation of the laser system.

It is a further object of the present invention to provide an optical fiber attachment method which avoids stress-related problems associated with different optical fiber and substrate CTE values.

In accordance with the above objects, the present invention involves a new and efficient method for attaching an optical fiber to a substrate to form a structurally secure optical fiber package. Specifically, an optical fiber is coated in a conventional manner with an external layer of gold. A silicon retaining member is provided having a groove therein sized to retain and receive the coated optical fiber. The silicon retaining member and optical fiber are then positioned on a substrate preferably constructed of alumina. Deposited on the substrate is at least one metal pad having an external gold layer on which the silicon retaining member is placed. The optical fiber, silicon retaining member, and substrate are then heated at a temperature sufficient to form a silicon/gold eutectic alloy between the silicon of the retaining member and the gold layers of the optical fiber and pad. Such heating requires a temperature of at least 370° C. Heating is preferably accomplished using a resistor secured to the underside of the substrate. The resulting package is characterized by improved strength, durability, and structural integrity.

These and other objects, advantages, and features of the present invention will become apparent to those of ordinary skill in the art in view of the detailed description and the drawing figures provided herein.

BRIEF DESCRIPTION OF THE DRAWINGS

FIG. 1 is an exploded perspective view of the components used in one embodiment of the invention.

FIG. 2 is an exploded perspective view of the components used in an alternative embodiment of the invention.

FIG. 3 is a perspective view of an assembled optical fiber package corresponding to the embodiment of FIG. 1 with the components thereof in position and ready for heating.

FIG. 4 is a perspective view of an assembled optical fiber package corresponding to the embodiment of FIG. 2 with the components thereof in position and ready for heating.

FIG. 5 is a cross sectional view of the optical fiber package of FIG. 3 taken along lines 5—5.

FIG. 6 is a schematic longitudinal cross section of an optical fiber package produced in accordance with the present invention secured to the support structure associated with a laser light source.

DETAILED DESCRIPTION

The present invention represents an improved attachment method for securing an optical fiber to a substrate. The resulting product is characterized by superior structural integrity. The major components used in constructing an optical fiber package 10 in accordance with the present invention are shown in FIGS. 1 and 2. An optical fiber 12 is first provided, preferably constructed of fused silica. The fiber 12 is typically about 125 microns in diameter. Applied to the outer surface of the optical fiber 12 is an external gold layer 14. To facilitate adhesion of the gold layer 14 to the outer surface of the optical fiber 12, one or more metal binder layers (not shown) are preferably applied to the optical fiber 12 before application of the gold layer 14. For example, a base layer of titanium followed by a layer of nickel may be applied to the optical fiber 12 before application of the gold layer 14. The gold layer 14 is then applied to the binder layers using conventional processes including evaporative metal deposition or plating techniques. The gold layer 14 should be at least 0.5 microns in thickness, and need not extend along the entire length of the optical fiber 12, as discussed below.

Next, a silicon retaining member 16 is provided having a groove 18. The groove 18 is sized to receive the optical fiber 12. For an optical fiber which is about 125 microns in diameter, it is preferred that the groove be approximately 125 microns wide and 125 microns deep. Furthermore, the length of the gold layer 14 along the optical fiber 12 must be at least equal to the length of the silicon retaining member 16.

With the optical fiber 12 positioned within the groove 18 of the silicon retaining member 16, the member 16 and fiber 12 are placed on a substrate 22. The substrate 22 is preferably constructed of alumina ($Al_2O_3$) Deposited on the substrate 22 is at least one metal pad 24 which includes an external gold layer 26 approximately 6 to 8 microns thick. The pad 24 may also include a plurality of underlying metal binder layers (not shown). For example, successive layers of titanium, palladium, and gold may first be applied by evaporative deposition to the substrate 22, with the external gold layer 26 being plated on top. In the alternative, fritted gold or other gold pastes known in the art may be directly applied to the substrate 22 to form the external gold layer 26.

Although it is preferred that the pad 24 be unitary in construction, such pad may also consist of two separate pads 28 each having an external gold layer 29. Such pads are prepared as described above with respect to pad 24, and illustrated in FIG. 2. In the embodiment of FIG. 2, the pads 28 would be separated by a distance equal to the width of the groove 18 in the member 16. Thus, such pads would be separated by a distance of 125 microns if a 125 micron wide groove were used.

The silicon retaining member 16 is then positioned directly on the pad 24 or pads 28 with the groove 18 facing downward as shown in FIGS. 1 and 2. The resulting optical fiber package 10 is shown in FIGS. 3 and 4. A cross sectional view of the embodiment of FIG. 3 is shown in FIG. 5.

To complete production of the optical fiber package 10, heat is applied to the package. Preferably, a resistor 34 is secured to the underside 36 of the substrate 22, as shown in FIGS. 1-6. Resistors typically used in the invention include those of the nichrome variety applied using evaporative deposition processes. In the alternative, conventional resistor pastes known in the art may be applied using screen print methods.

The resistor 34 is connected to a source of electrical current (not shown). Current flowing through the resistor 34 generates heat which bonds the components of the package 10 together. In the alternative, external heating sources may be used, including the use of a conventional heating block system or the like.

To bond the above-described components together, such heating must involve temperatures of at least 370° C. This temperature permits the formation of a silicon/gold eutectic alloy between the silicon of the retaining member 16 and the gold layers 14, 26 of the optical fiber 12 and pad 24 (or pads 28). As a result, the retaining member 16 is bonded to the substrate 22. Likewise, the optical fiber 12 is physically bonded within the groove 18 of the silicon retaining member 16. Silicon/gold eutectic alloy fills the voids 40, 42, 44, and 46 between the fiber 12 and retaining member 16.

In the embodiment of FIGS. 1, 3, and 5 which involves a single pad 24, only the lower portion 49 of the optical fiber 12 is bonded to the pad 24 after heating. The majority of the optical fiber 12 is bonded to the silicon retaining member 16. If a dual pad system were used, the optical fiber 12 would not be bonded at any point to the substrate 22.

FIG. 6 shows a schematic longitudinal cross-section of a completed optical fiber package 10 secured to a support structure 50 associated with a conventional laser diode 54. The completed optical fiber package 10 is characterized by superior structural integrity. The silicon/gold eutectic alloy has a melting point of approximately 370° C., which is considerably higher than the temperatures associated with attachment of the optical fiber package 10 to a laser support structure. The package can be bonded by soldering or the like to a laser support structure at temperatures of up to 370° C. (the eutectic temperature of silicon/gold) without disrupting the internal bond structure of the package.

The package is also secure at operating temperatures of up to 370° C. Thus, the method discussed herein involving the use of a silicon/gold eutectic alloy represents an advance in optical fiber packaging technology. Such method avoids the introduction of foreign metals to the system, including those introduced when lead/tin solders are used. In addition, the structural integrity of the system is enhanced through the use of a retaining member which serves a dual function. In addition to having desirable expansion characteristics as discussed below, the retaining member is constructed of a material (silicon) which readily and securely attaches to the other components of the system.

Moreover, the method described herein avoids problems associated with CTE mismatch between the optical fiber and the substrate. As previously noted, stress problems often occur when an optical fiber is directly secured to a substrate, followed by the application of heat. A typical gold plated, fused silica optical fiber as used in the present invention has a CTE of approximately $0.5 \times 10^{-6°}$ C.$^{-1}$, and a typical alumina substrate has a CTE of approximately $7.0 \times 10^{-6°}$ C.$^{-1}$. Direct bonding of these components results in a substantial CTE mismatch and potential loss of structural integrity at operating/assembly temperatures. By bonding the optical fiber to a grooved block of silicon which has a CTE relatively close to that of the optical fiber, CTE mismatch problems are minimized. The CTE of a grooved block of pure silicon as used in the present invention is approximately $2.5 \times 10^{-6°}$ C.$^{-1}$.

In the embodiment of FIGS. 1, 3, and 5, the optical fiber 12 is primarily bonded to the silicon retaining member 16, as discussed above. Even though some bonding of the optical fiber 12 occurs with respect to the substrate 22, tests conducted using this package have shown that stress-related problems are minimized in comparison with conventional attachment methods. Although the embodiment of FIGS. 2 and 4 avoids bonding of the optical fiber 12 to the substrate 22, the embodiment of FIGS. 1, 3, and 5 is preferred in that it is easier to mass produce.

The foregoing is considered as illustrative only of the basic principles of the invention. Numerous elements of the above-described embodiments may be varied within the scope of the invention. Since modifications and changes may readily occur to those skilled in the art, it is not desired to limit the invention to the exact construction as shown above. Accordingly, all suitable modifications and equivalents may be resorted to, within the scope of the invention as described in the following claims.

I claim:

1. A method for attaching an optical fiber to a substrate comprising:
   providing a silicon member having a groove therein sized to receive an optical fiber;
   inserting an optical fiber within said groove, said optical fiber being coated with at least one layer of metal;
   positioning said silicon member on a substrate having at least one metal pad thereon, said silicon member being placed directly on said pad; and
   heating said substrate, silicon member, and optical fiber at a temperature sufficient to cause the silicon of the silicon member to form a eutectic alloy with both the layer of metal on said optical fiber, and the metal pad on said substrate.

2. The method of claim 1 wherein said optical fiber is comprised of fused silica.

3. The method of claim 1 wherein said layer of metal on said optical fiber comprises an external layer of gold.

4. The method of claim 1 wherein said substrate is comprised of alumina.

5. The method of claim 1 wherein said metal pad on said substrate comprises an external layer of gold.

6. The method of claim 1 wherein said silicon member, optical fiber, and substrate are heated at a temperature of at least 370° C.

7. The method of claim 1 wherein said substrate comprises two metal pads deposited thereon, said pads being parallel to and spaced apart from each other, the distance between said pads being substantially equal to the width of said groove in said silicon member.

8. The method of claim 1 wherein said heating is provided by at least one resistor connected to a source of electrical current, said resistor being affixed to said substrate.

9. The product of the method of claim 1.

10. A method for attaching an optical fiber to a substrate comprising:
    providing a silicon member having a groove therein sized to receive an optical fiber;
    inserting an optical fiber within said groove, said optical fiber having an external layer of gold thereon;
    positioning said silicon member on a substrate having at least one metal pad thereon, said metal pad comprising an external layer of gold, said silicon member being placed directly on said external layer of gold of said pad; and
    heating said substrate, silicon member, and optical fiber at a temperature sufficient to cause the silicon of the silicon member to form a eutectic alloy with both the external layer of gold on said optical fiber, and the external layer of gold of said metal pad.

11. The method of claim 10 wherein said substrate is comprised of alumina.

12. The method of claim 10 wherein said silicon member, optical fiber, and substrate are heated at a temperature of at least 370° C.

13. The method of claim 10 wherein said heating is accomplished by at least one resistor connected to a source of electrical current, said resistor being affixed to said substrate.

14. The product of the method of claim 10.

15. A method for attaching an optical fiber to a substrate comprising:
    providing a silicon member having a groove therein sized to receive an optical fiber;
    inserting an optical fiber within said groove, said optical fiber comprising an external layer of gold thereon;
    positioning said silicon member on a substrate comprised of alumina, said substrate having at least one metal pad thereon, said metal pad comprising an external layer of gold, said silicon member being placed directly on said external layer of gold of said pad; and
    heating said substrate, silicon member, and optical fiber at a temperature of at least 370° C., said temperature being sufficient to cause the silicon of the silicon member to form a eutectic alloy with both the external layer of gold on said optical fiber, and the external layer of gold of said metal pad, said heating being accomplished by at least one resistor connected to a source of electrical current, said resistor being affixed to said substrate.

16. The product of the method of claim 15.

* * * * *